Dec. 30, 1952   B. H. RILEY ET AL   2,623,500
POULTRY FOUNTAIN
Filed Feb. 20, 1952
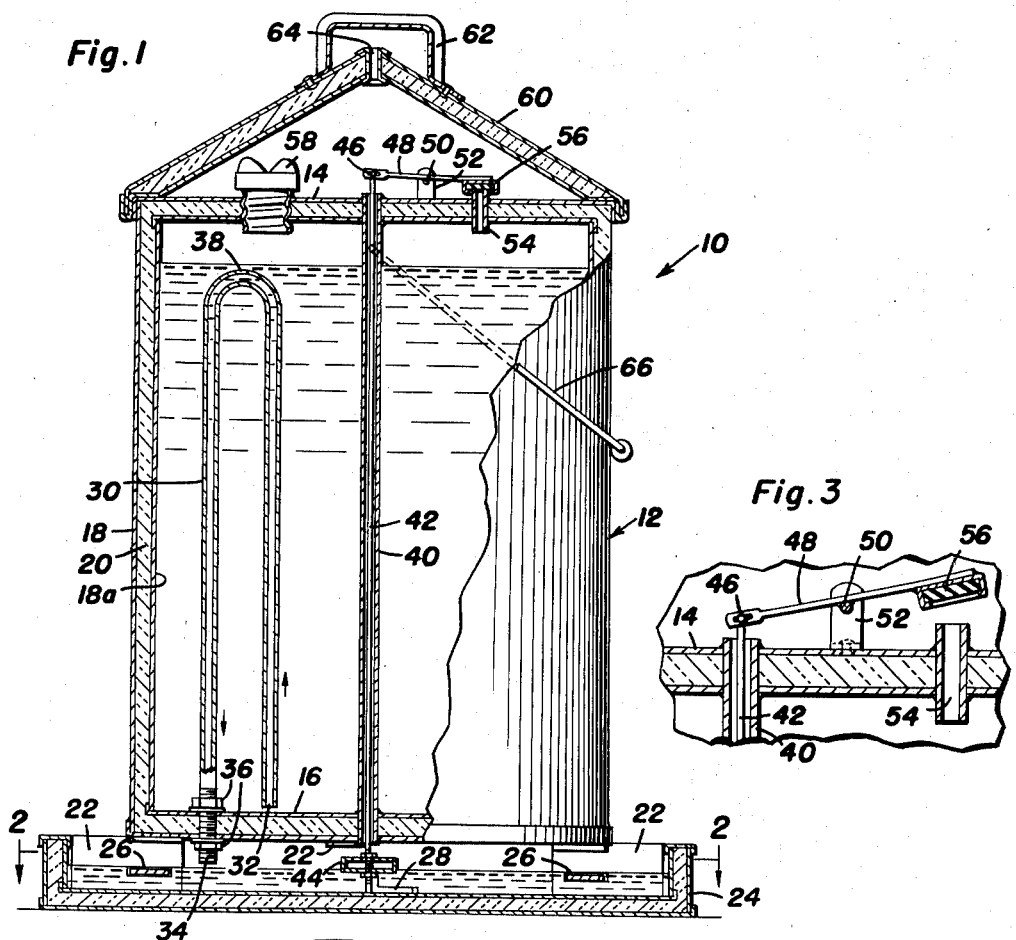
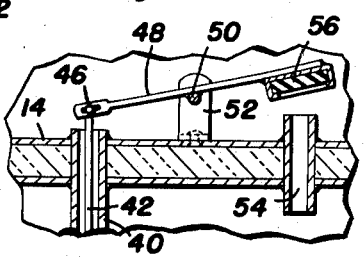
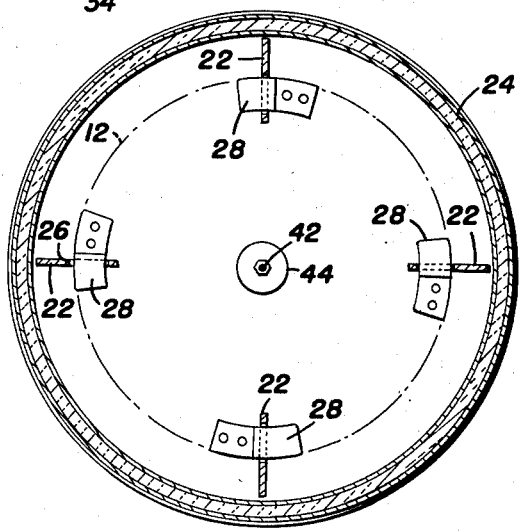
Ben H. Riley
Hobart Riley
INVENTORS.

Patented Dec. 30, 1952

2,623,500

UNITED STATES PATENT OFFICE 2,623,500

POULTRY FOUNTAIN

Ben H. Riley and Hobart Riley, Lathrop, Mo.

Application February 20, 1952, Serial No. 272,662

4 Claims. (Cl. 119—78)

This invention relates to new and useful improvements and structural refinements in poultry fountains, particularly fountains of the type employing a water receptacle and a drinking pan, and the principal object of the invention is to provide novel means for delivering water from the receptacle into the pan, responsive to the rising and falling of the water level in the pan.

Some of the advantages of the invention reside in its simplicity of construction, in its efficient and dependable operation and its adaptability to economical manufacture.

With the above more important objects and features in view, and such other objects and features as may become apparent as this specification proceeds, the invention consists essentially of the arrangement and construction of parts as illustrated in the accompanying drawings, in which:

Figure 1 is a vertical sectional view of the invention;

Figure 2 is a horizontal sectional view on a reduced scale, taken substantially on the plane of the line 2—2 in Figure 1; and Figure 3 is an enlarged fragmentary sectional view of the air inlet valve used in the invention, the same being shown in its open position.

Like characters of reference are employed to designate like parts in the specification and throughout the several views.

Referring now to the accompanying drawings in detail, the invention consists of a poultry fountain which is designated generally by the reference character 10 and embodies in its construction a cylindrical water receptacle 12 having a closed top and bottom 14, 16, respectively, it being noted that the side wall of the receptacle as well as the top and bottom thereof are preferably formed from two spaced sheets of material with a layer of insulation therebetween, an exemplified at 18, 18a, 20, in Figure 1. This arrangement is to minimize the possibility of the water in the receptacle freezing.

The bottom 16 of the receptacle 12 has secured to the underside thereof a plurality of downwardly and outwardly projecting brackets 22 which are removably received in a circular drinking pan 24. This pan is substantially larger in diameter than the receptacle 12 so that the birds may gain access to the water in the pan in the marginal edge portions of the pan, and if desired, the pan may also be constructed from two thicknesses of material with insulation therebetween as shown.

The brackets 22 are provided with horizontal slots 26 to removably receive upwardly offset portions of hook-shaped detents 28 which are secured to the bottom of the pan 24, this arrangement being such that by simply turning or twisting the receptacle 12 relative to the pan 24 the detents 28 may be disengaged from the slots 26 and the receptacle separated from the pan.

Means for delivering water from the receptacle into the pan comprise an inverted U-shaped delivery tube 30 which is disposed within the receptacle with one end 32 thereof being closely spaced above the receptacle bottom 16, while the other end portion of the tube extends downwardly through the bottom into the pan 24 and is screw threaded as indicated at 34 to receive a pair of nuts 36 for securing the entire tube in position. The bight portion 38 of the tube 30 is spaced downwardly somewhat from the top 14 of the receptacle.

A tubular duct 40 extends vertically through the receptacle 12, that is, from under the bottom 16 to above the top 14, and a control rod 42 is slidable vertically in the duct. The lower end of the rod 42 has secured thereto a float 44 which is buoyant on the water in the pan 24 and the upper end of the rod 42 is pivoted at 46 to a lever 48 which is swingably mounted at 50 in a suitable bracket 52 carried by the top 14.

A tubular air vent 54 is provided in the top 14 of the receptacle 12 and the upper end of the vent may be closed by a valve member 56 carried by the lever 48. It will be apparent from the foregoing that when the float 44 decends with the level of water in the pan 24, the rod 42 will be shifted downwardly in the duct 40 and the valve member 56 will open the vent 54. Conversely, when the float rises the vent will be closed.

The top 14 of the receptacle 12 is provided with a filler plug 58 and a removable, conical cover 60, equipped with a suitable handle 62, is positioned on the top of the receptacle, as shown. The cover 60 is provided at the center thereof with an air vent 64 whereby the interior of the receptacle 12 may communicate with the atmosphere when the valve member 56 is open.

A swingable bail assembly 66 may be provided on the receptacle 12 for purposes of carrying the entire fountain from one location to another.

When the invention is placed in use, the receptacle 12 may be filled with water by removing the cover 60 and the filler plug 58. With the pan 24 empty, the valve member 56 will be in its open position as shown in Figure 3, and as the water rises in the receptacle 12, it will also rise in the right hand portion of the delivery tube 30 until it reaches the bight portion 38 of the delivery tube, after which the water in the tube will gravitate downwardly into the pan 24. This, of course, will take place while the receptacle is being filled and will continue to do so even after the filling of the receptacle has been completed and the plug 58 replaced, as long as the valve member 56 remains open.

However, when the water in the pan 24 reaches a predetermined level, the rising float 44 will close the valve member 56, thus shutting off atmospheric pressure from the interior of the receptacle 12 and preventing further egress of water through the delivery tube 30 until the valve member 56 is again opened.

It is believed that the advantages and use of the invention will be readily understood from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. In a poultry fountain, the combination of a pan, a water receptacle mounted above said pan and having a closed top and bottom, an inverted U-shaped delivery tube in said receptacle and having one end thereof spaced above the bottom of the receptacle, the other end portion of said tube projecting downwardly through the bottom of the receptacle into said pan, a filler plug in the upper portion of the receptacle, an air inlet valve in the top of the receptacle, a float in said pan, and means operatively connecting said float to said valve whereby the valve may be opened by downward movement of the float.

2. The device as defined in claim 1 together with means for separably connecting said receptacle to said pan.

3. The device as defined in claim 1 together with a tubular duct extending vertically through said receptacle, said last mentioned means comprising a rod slidable in said duct and having said float secured to the lower end thereof, and a lever operatively connecting the upper end of said rod to said valve.

4. The device as defined in claim 1 together with a plurality of brackets provided on the bottom of said receptacle and resting in said pan, said brackets having keeper slots therein, and a plurality of hook-shaped detents provided in said pan and extending through said slots, whereby to separably connect said receptacle to the pan.

BEN H. RILEY.
HOBART RILEY.

REFERENCES CITED

The following references are of record in the file of this patent:

UNITED STATES PATENTS

| Number | Name | Date |
|---|---|---|
| 1,021,209 | Platt | Mar. 26, 1912 |
| 1,055,624 | Enos, Jr. | Mar. 11, 1913 |